US012608601B2

(12) United States Patent
    Allahdadian et al.

(10) Patent No.: US 12,608,601 B2
(45) Date of Patent: Apr. 21, 2026

(54) STATISTICAL CONFIDENCE METRIC FOR RECONSTRUCTIVE ANOMALY DETECTION MODELS

(71) Applicant: Oracle International Corporation, Redwood Shores, CA (US)

(72) Inventors: Saeid Allahdadian, Vancouver (CA); Matteo Casserini, Zurich (CH); Andrew Brownsword, Vancouver (CA); Amin Suzani, Vancouver (CA); Milos Vasic, Zurich (CH); Felix Schmidt, Niederweningen (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 979 days.

(21) Appl. No.: 17/098,822

(22) Filed: Nov. 16, 2020

(65) Prior Publication Data

US 2022/0156578 A1 May 19, 2022

(51) Int. Cl.
    *G06N 3/08* (2023.01)
    *G06F 17/18* (2006.01)
    (Continued)

(52) U.S. Cl.
    CPC .............. *G06N 3/08* (2013.01); *G06F 17/18* (2013.01); *G06F 18/217* (2023.01); *G06F 18/22* (2023.01)

(58) Field of Classification Search
    CPC .......... G06N 3/08; G06N 3/045; G06N 3/084; G06N 5/01; G06N 20/00; G06N 3/088;
    (Continued)

(56) References Cited

U.S. PATENT DOCUMENTS 10,069,900 B2    9/2018  Poola et al.
11,538,143 B2 * 12/2022  Song ...................... G06F 18/22
                         (Continued)

FOREIGN PATENT DOCUMENTS

RO          114697 B1 *  6/1999
RO          131294    *  7/2016

OTHER PUBLICATIONS

Chakraborty et al., "Early detection of faults in HVAC systems using an XGBoost model with a dynamic threshold", Energy and Buildings, dated 2019, pp. 326-344.
                         (Continued)

*Primary Examiner* — Hassan Mrabi
(74) *Attorney, Agent, or Firm* — Hickman Becker Bingham Ledesma LLP

(57)                    ABSTRACT

Approaches herein relate to reconstructive models such as an autoencoder for anomaly detection. Herein are machine learning techniques that measure inference confidence based on reconstruction error trends. In an embodiment, a computer hosts a reconstructive model that encodes and decodes features. Based on that decoding, the following are automatically calculated: a respective reconstruction error of each feature, a respective moving average of reconstruction errors of each feature, an average of the moving averages of the reconstruction errors of all features, a standard deviation of the moving averages of the reconstruction errors of all features, and a confidence of decoding the features that is based on a ratio of the average of the moving averages of the reconstruction errors to the standard deviation of the moving averages of the reconstruction errors. The computer detects and indicates that a threshold exceeds the confidence of decoding, which may cause important automatic reactions herein.

18 Claims, 5 Drawing Sheets

SOFTWARE SYSTEM 500

(51) Int. Cl.
    *G06F 18/21*         (2023.01)
    *G06F 18/22*         (2023.01)
(58) Field of Classification Search
    CPC ........ G06F 17/18; G06F 18/217; G06F 18/22;
                 G06F 18/2135; G06F 18/2193; G06F
                                      18/2433
    See application file for complete search history.

(56)               References Cited

U.S. PATENT DOCUMENTS

2014/0298141 A1 *   10/2014   Grube ................. G06F 9/30145
                                          714/768
2016/0092516 A1     3/2016   Poola et al.

OTHER PUBLICATIONS

Jain et al., "Score normalization in multimodal biometric systems", Pattern Recognition 38, dated Jan. 2005, 16 pages.
Hu et al., "Anomalous User Activity Detection in Enterprise Multi-Source Logs", dated Nov. 2017, 8 pages.
Golan et al., "Deep Anomaly Detection Using Geometric Transformations", 32nd Conference on Neural Information Processing Systems (NeurIPS dated 2018), Montréal, Canada, 12 pages.
Gama et al., "A Survey on Concept Drift Adaptation", ACM Computing Surveys, vol. 1, No. 1, Article 1, Publication date: Jan. 2013, 44 pages.
Dong et al., "Quality-Based Dynamic Threshold for Iris Matching", IEEE, dated 2009, 4 pages.
Alexey Tsymbal, "The Problem of Concept Drift: Definitions and Related Work", dated Apr. 29, 2004, 7 pages.
Chang et al., "A Dynamic Threshold Decision System for Stock Trading Signal Detection", Applied Soft Computing 11, dated 2011, 13 pages.
Luo, "A Revisit of Sparse Coding Based Anomaly Detection in Stacked RNN Framework", IEEE, dated 2017, 9 pages.
Bontemps et al., "Collective Anomaly Detection based on Long Short Term Memory Recurrent Neural Network", dated Mar. 2017, 13 pages.
Bockermann, "Learning SQL for Database Intrusion Detection Using Context-Sensitive Modelling", DIMVA 2009, LNCS 5587, dated 2009, 10 pages.
Bach et al., A Bayesian Approach to Concept Drift, dated 2010, 9 pages.
Apel et al., "Learning SQL for Database Intrusion Detection using Context-sensitive Modelling", dated 2009, 33 pages.
Alon, et al., "code2vec: Learning Distributed Representations of Code", Proc. ACM Program. Lang., vol. 3, No. POPL, Article 40. Publication date: Jan. 2019, 29 pages.
Allahdadian et al., "A Nonlinear Optimization Method with Focus", dated 2018, 1 page.
Collins et al., "Convolution Kernels for Natural Language", dated 2002, 8 pages.
Naseer et al., "Enhanced Network Anomaly Detection Based on Deep Neural Networks", Journal of Latex Class Files, vol. 14, No. 8, Aug. 2015, 16 pages.
Xu et al., "Detecting Large-Scale System Problems by Mining Console Logs", dated 2009, 16 pages.
Xiang et al., "Learning a Mahalanobis distance metric for data clustering and classification", Pattern Recognition 41, dated 2008, 13 pages.
Webb et al., Characterizing Concept Drift, Data Mining and Knowledge Discovery, dated Jul. 2016, 30 pages.
Singh et al., "Quantitative Evaluation of Normalization Techniques of Matching Scores in Multimodal Biometric Systems", Springer-Verlag Berlin Heidelberg, dated 2007, 10 pages.
Shipmon et al., "Time Series Anomaly Detection", Detection of Anomalous Drops with Limited Features and Sparse Examples in Noisy Highly Periodic Data, dated 2017, 9 pages.
Shen et al., "Scalable Large-Margin Mahalanobis Distance Metric Learning", IEEE, vol. 30, No. 9, dated 2010, 7 pages.
Kim et al., "Behavior-based anomaly detection on big data", Edith Cowan University, Research Online, dated 2015, 9 pages.
Platt, John, "Probabilistic Outputs for Support Vector Machines and Comparisons to Regularized Likelihood Methods", dated Mar. 6, 1999, 11 pages.
Kolter et al., "Dynamic Weighted Majority: An Ensemble Method for Drifting Concepts", Journal of Machine Learning Research 8, dated 2007, 36 pages.
N.Krishnavardhan, "A Framework to Identify Cybercrime Using Data Analytics", International Journal of Pure and Applied Mathematics, vol. 120, No. 6 dated Jun. 11, 2018, 14 pages.
Moustafa et al., "A holistic review of Network Anomaly Detection Systems: A comprehensive survey", Journal of Network and Computer Applications vol. 128, Feb. 15, 2019, pp. 33-55.
Mei et al., "Learning a Mahalanobis Distance based Dynamic Time Warping Measure for Multivariate Time Series Classification", IEEE, dated 2015, 12 pages.
Mathuranathan, Q Function and Error functions : Demystified, dated Jul. 16, 2012, https://www.gaussianwaves.com/2012/07/q-function-and-error-functions/, 7 pages.
Malhotra et al., "Long Short Term Memory Networks for Anomaly Detection in Time Series", ESANN dated Apr. 2015 proceedings, 6 pages.
Zhou et al., "Tree Kernel-based Relation Extraction with Context-Sensitive Structured Parse Tree Information", dated Jun. 2007, 9 pages.
Sabokrou et al., "Real-Time Anomaly Detection and Localization in Crowded Scenes", dated 2015, 7 pages.
Watson Openscale, "Drift Detection", https://dataplatform.cloud.ibm.com/docs/content/wsj/model/wos-behavior-overview.html, dated Jul. 2021, 5 pages.
Rabanser et al., "Failing Loudly: An Empirical Study of Methods for Detecting Dataset Shift", arXiv:1810.11953v4, https://tensorflow.org/tfx/data_validation/get_started#checking_data_skew_and_drift, Year 2019, 38 pages.
Pan et al., "Adversarial Validation Approach to Concept Drift Problem in User Targeting Automation Systems at Uber", arXiv:2004.03045v2, https://doi.org/10.1145/1122445.1122456, Year 2020, 6 pages.
Kingma et al., "An Introduction to Variational Autoencoders", Foundations and Trends in Machine Learning, vol. 12, No. 4, arXiv:1906.02691, Year 2019, 89 pages.
Google Cloud Blog, "Event-Triggered Detection of Data Drift in ML Workflows", : https://cloud.google.com/blog/topics/developers-practitioners/event-triggered-detection-data-drift-ml-workflows, dated Jul. 2021, 12 pages.
Databricks Webinar, "Productionizing Machine Learning: From Deployment to Drift Detection", https://databricks.com/wp-content/uploads/2019/09/8-1-2019-Productionizing-ML_-From-Deployment-to-Drift-Detection-Webinar.pdf, 2019, 45 pages.
Azure Machine Learning, "Detect Data Drift (Preview) on Datasets", https://docs.microsoft.com/en-us/azure/machine-learning/how-to-monitor-datasets?tabs=python, dated Jul. 2021, 18 pages.
Amazon Web Services, "Amazon SageMaker Model Monitor", https://aws.amazon.com/sagemaker/model-monitor/, dated Jul. 2021, 9 pages.
Ross, Gordon J., et al. "Exponentially weighted moving average charts for detecting concept drift", Pattern Recognition Letters 33.2 (Year: 2012).
Jaworski et al., "Concept drift detection using autoencoders in data streams processing", In International Conference On Artificial Intelligence and Soft Computing (Year: 2020).

* cited by examiner

COMPUTER 100

FIG. 2

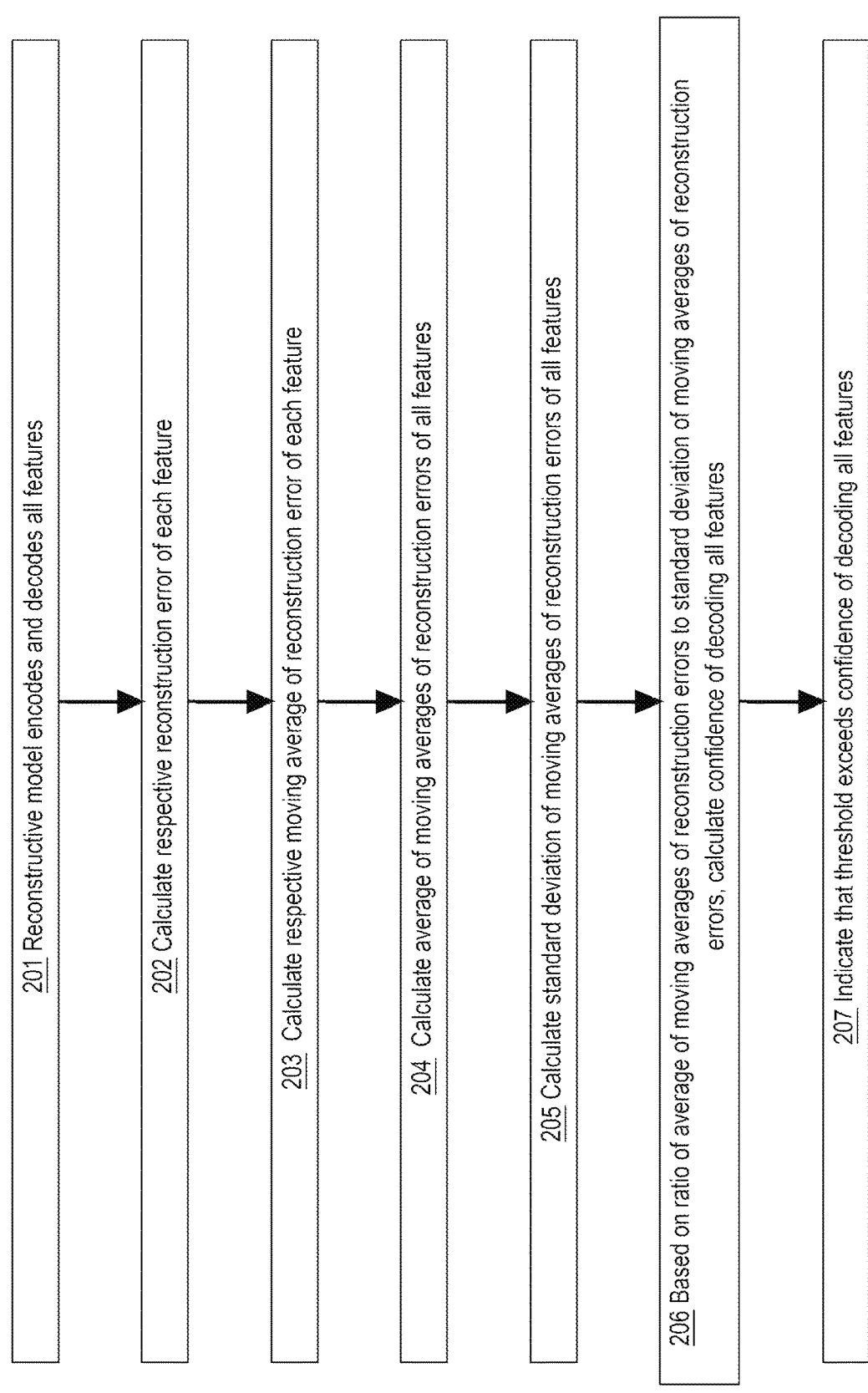

201 Reconstructive model encodes and decodes all features

202 Calculate respective reconstruction error of each feature

203 Calculate respective moving average of reconstruction error of each feature

204 Calculate average of moving averages of reconstruction errors of all features 205 Calculate standard deviation of moving averages of reconstruction errors of all features 206 Based on ratio of average of moving averages of reconstruction errors to standard deviation of moving averages of reconstruction errors, calculate confidence of decoding all features 207 Indicate that threshold exceeds confidence of decoding all features 301 Calculate respective one standard deviation of reconstruction error of each feature during validation of reconstructive model 302A Calculate mid-confidence value based on average of moving averages 302B Calculate mid-confidence value based on standard deviation of moving averages 303 Decrease average of moving averages by mid-confidence value

SOFTWARE SYSTEM 500

APPLICATION PROGRAM 1  502A

APPLICATION PROGRAM 2  502B

APPLICATION PROGRAM 3  502C

[...]

APPLICATION PROGRAM N  502N

502

OPERATING SYSTEM (e.g., WINDOWS, UNIX, LINUX, MAC OS, IOS, ANDROID, OR LIKE)  510

GRAPHICAL USER INTERFACE (GUI)  515

VIRTUAL MACHINE MONITOR (VMM)  530

BARE HARDWARE (e.g., COMPUTING DEVICE 400)

STATISTICAL CONFIDENCE METRIC FOR RECONSTRUCTIVE ANOMALY DETECTION MODELS

FIELD OF THE INVENTION

The present invention relates to reconstructive models such as an autoencoder for anomaly detection. Herein are machine learning techniques that measure inference confidence based on reconstruction error trends.

BACKGROUND

Anomaly detection is an important tool with various use cases in security such as fraud detection and intrusion detection. A powerful approach recently employed in anomaly detection involves machine learning models such as reconstructive neural nets such as an autoencoder. Anomaly detection using such models can be categorized into two groups of existing techniques. In the first group, the entire dataset is used for model training, and the reconstructive model is used to detect anomalies inside that dataset. In the second group, the data is discretized into three parts: training, validation, and test. The reconstructive model is trained on the training dataset and then fine-tuned using the validation dataset. Subsequently the trained and validated model is applied to the test dataset. The test dataset can be a nearly infinite stream of data incoming to the reconstructive model. Although such models can be made somewhat robust to input noise, they cannot handle input data distribution changes, which is a phenomenon called concept drift or data drift.

In one example, concept drift occurs when a series of inputs evolves over time such that later normal inputs have feature values that are no longer within the value range of earlier normal inputs such as training inputs. For example, a reconstructive model may be a classifier that learned to distinguish normal tree seedlings from normal weeds because seedlings are smaller than weeds. However over time, seedlings may grow to be a same size as weeds or grow into trees that are bigger than weeds, which may confuse the classifier. For example, the classifier may mistakenly classify an older seedling as a weed.

Concept drift may have various causes. For example, seasonality may cause a normal temperature range to shift such that a normal temperature may be mistakenly detected as anomalous or an abnormal temperature may be mistakenly detected as non-anomalous. Seasonality may influence consumer preferences which may interfere with a predictive machine learning model for a supply chain or for behavioral advertisement targeting.

Concept drift naturally happens in many or most real-world systems, where the system is inherently dynamic or dependent on dynamic parameters such as the evolving state of a server machine in time. Such shifts in data are usually inevitable because the system is dynamic and cannot be controlled or predicted in every aspect. Moreover, machine learning model performance is highly dependent on the distribution of previous data involved during a training phase. After fitting to training data, a machine learning model may be unable to handle concept drift.

In industry, an existing solution for concept drift is usually to retrain the machine learning model with new data, in which case, the retrained model learns the new distribution of the data and can do well in detecting anomalies happening after the concept drift that necessitated retraining. However, a sufficient amount of data is needed after the concept drift in order to be able to retrain the model, which means, in some applications, several hours or days need to pass to be able to accumulate enough real data from a concept drift before retraining. In addition, retraining a machine learning model and redeploying it after a concept drift usually takes significant amount of time. In those ways, retraining may impose a somewhat prolonged service outage of a machine learning model.

BRIEF DESCRIPTION OF THE DRAWINGS

In the drawings:

FIG. 2 is a flow diagram that depicts an example computer process that measures, based on reconstruction error trends, confidence of inferencing by a reconstructive model;

DETAILED DESCRIPTION

Figure 1:
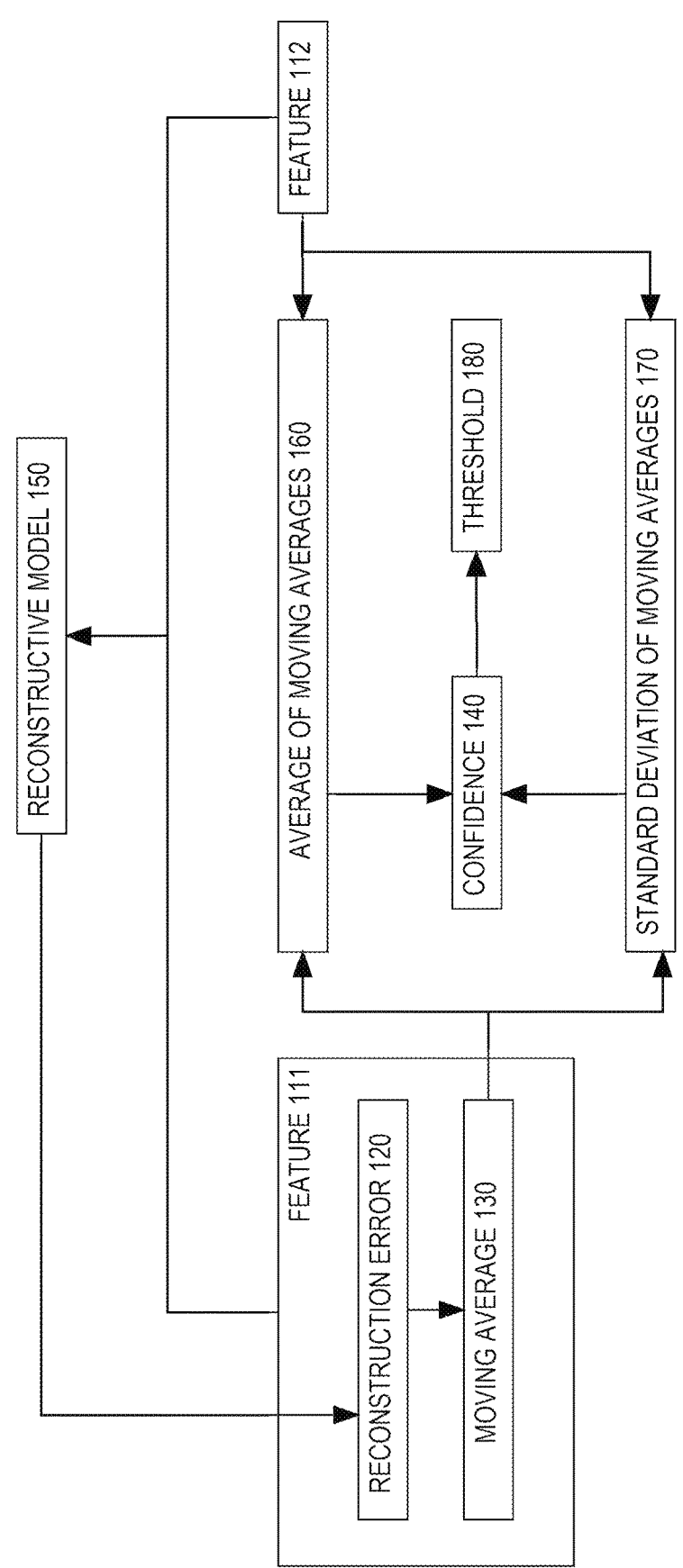
FIG. 1 is a block diagram that depicts an example computer that, Based on reconstruction error trends, measures confidence of inferencing by a machine learning (ML) model such as a reconstructive model.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

A reconstructive model is a machine learning (ML) model that can encode and decode a complex input, wherein decoding entails more or less accurate reconstruction of the original input from the encoding. Concept drift is a prolonged trend that causes a shift in a value range of a feature of inputs, which may cause the reconstructive model to malfunction.

Approaches herein calculate confidence as a statistical metric that indicates performance quality of a reconstructive model for anomaly detection, which may help in understanding the proficiency of the reconstructive model and the quality of the model's inferencing results. The confidence metric uses moving average and moving standard deviation measurements to characterize reconstruction errors of multiple features that the reconstructive model processes. If measured confidence is low, then it signifies that model performance has deteriorated, such as in a production environment that cannot afford excessive malfunctions.

Quality of a model should be estimated using a statistical characterization of model performance. Confidence measurement should be sensitive enough to detect and react to changes affecting model performance. However, there is a design tension between increasing such sensitivity and, instead, being robust to temporary value distribution imbalances or a natural increase in actual anomalies. To address those concerns, confidence herein is statistically defined to accommodate natural fluctuations and different operational conditions. These techniques entail statistical comparison of the distribution of more or less accurate reconstructions, as explained herein, of each feature compared to input data in a continuous manner. The result is a confidence metric that represents the quality of the model for each item in a stream or batch of incoming data.

Approaches herein calculate statistical metrics over reconstruction error that measure moving parameters of a fluctuating error distribution. Gauging model confidence based on moving statistics of reconstruction errors is novel. These statistics, measurements, and calculations are robust to noisy data inputs.

Herein are statistical moving parameters for monitoring the behavior of every feature of inputs. Statistical moving parameters can follow the distribution of errors from a reconstructive anomaly detection model. These parameters give important information about trends and behavior of the errors of each feature over time and therefore can be used to define a quality metric from those errors.

Statistical moving parameters herein are computationally efficient and therefore are suitable for large scale problems and/or embedded deployments that may have high data rates, low computational resource availability, and/or low latency deadlines such as for live real-time stream processing. These moving statistics are robust in dealing with abrupt changes in the input data stemming from the natural distribution of data compared to the changes from concept drift as explained herein. That is, these measurements can distinguish trends versus spikes.

A computer may operate measurements and calculations herein in a live environment with a high-speed input stream of inputs such as telemetry without incurring additional latency nor consuming excessive computational resources such that processing overhead for metrics does not interfere with a reconstructive model that provides low-latency inferences in real time. Additionally as explained herein, measured confidence facilitates an evolutionary approach that encourages experimentation and exploration of alternative configurations, implementations, and architectures to increase inference accuracy, decrease training time, and/or decrease computer resource consumption in production.

Techniques herein can be used in an automated fashion without any need for manual intervention. Measured confidence can quantify intensities of concept drifts and inform when retraining is needed. In these ways, confidence measurement is an important health monitoring activity for system administration.

Applicability of this approach is broad and spans various data-intensive industries, machine learning purposes, and machine learning architectures. This approach can be used for security and operational health monitoring for datacenters and software through log analytics, intrusion detection, and pattern analysis. Enterprise and cloud servers can derive advantage from this approach. In addition, log data analysis has numerous applications in fault detection or security monitoring for internet of things (IoT). This approach can be used for fraud detection in credit card processing and other financial technology (FinTech) security applications.

In an embodiment, a computer hosts a reconstructive model that encodes and decodes features. Based on that decoding, the following are automatically calculated: a respective reconstruction error of each feature, a respective moving average of reconstruction errors of each feature, an average of the moving averages of the reconstruction errors of all features, a standard deviation of the moving averages of the reconstruction errors of all features, and a confidence of decoding the features that is based on a ratio of the average of the moving averages of the reconstruction errors to the standard deviation of the moving averages of the reconstruction errors. Herein, confidence of decoding is also known as confidence of inferencing. The computer detects and indicates that a threshold exceeds the confidence of decoding, which may cause important automatic reactions herein.

1.0 Example Computer

FIG. 1 is a block diagram that depicts an example computer 100, in an embodiment. Based on reconstruction error trends, computer 100 measures confidence of inferencing by a machine learning (ML) model such as reconstructive model 150. Computer 100 may be one or more of a rack server such as a blade, a personal computer, a mainframe, a virtual computer, a smartphone, or other computing device.

Computer 100 stores already-trained reconstructive model 150 that is an ML model, such as an autoencoder as discussed later herein, in memory. Reconstructive model 150 processes a complex input to generate an inference such as a prediction or classification. Reconstructive model 150 is any ML model that also more or less accurately regenerates its input, which includes features 111-112. Input reconstruction has different purposes at different phases in the lifecycle of reconstructive model 150 as follows.

Reconstructive model 150's lifecycle has two phases, which are laboratory training followed by production inferencing. Learning occurs during training, which input reconstruction may improve. Learning may entail internal adjustment of reconstructive model 150 based on measured error of model inferences.

1.1 Autoencoder

In an embodiment, reconstructive model 150 is an autoencoder. Backpropagation training of an artificial neural network (ANN) such as an autoencoder as discussed later herein may be driven by model error. With supervised training, model error may be measured by comparing an inference by an ML model to a predefined label that is already established as the correct inference. With unsupervised training, such as with an autoencoder, predefined labels may be unavailable, and error may instead be measured based on diagnostic output from the autoencoder as follows.

In an embodiment, an autoencoder may be a multilayer perceptron (MLP) that generally provides dimensionality reduction, regardless of whether the autoencoder is used for classification or anomaly detection. As discussed above, classification entails associating an inferred label with a complex input. In other words, classification entails recognizing a learned pattern. Anomaly detection does the opposite, which is recognizing that an input does not match any learned pattern.

In any case, an autoencoder provides dimensionality reduction, which: a) entails avoiding analysis and integration of irrelevant features of an input, and b) generating a more concise internal neural representation of the input in which only meaningful input features are retained. In other words, an autoencoder extracts semantic details of a complex, noisy, and fuzzy input. Thus, the autoencoder converts a sparse representation of an input into a dense encoding. Features and feature representation are discussed later herein.

Generally during training, an autoencoder learns which features should be deemphasized and how to encode retained semantic features. An autoencoder herein further is a reconstructive model because the autoencoder contains additional neural layers that are trained to regenerate the original input. In other words, the autoencoder encodes input into a semantic coding, which the autoencoder further decodes back into a more or less accurate copy of the input.

In an embodiment, reconstructive model 150 instead is a principal component analysis (PCA). Although operationally very different from an autoencoder, PCA is a reconstructive model that is functionally similar to an autoencoder as follows. Like an autoencoder, PCA undergoes unsupervised training to learn dimensionality reduction and minimize reconstruction error. Architectures of PCA and autoencoders are discussed later herein.

1.2 Reconstruction Error

A measured difference between the original input and the regenerated input is known as reconstruction error. Because the original input and the regenerated input are composed of individual features, a difference may be measured between an original feature and a reconstructed feature to calculate a respective reconstruction error for that feature. In other words, a respective reconstruction error may be measured for each of features 111-112. For example, feature 111 has reconstruction error 120. Although not shown, feature 112 also has a reconstruction error.

Integration, such as summing or averaging, of respective reconstruction errors of all features 111-112 may be used to calculate a loss that measures how much relevant information did reconstructive model 150 lose when inferencing for an input. As discussed below, loss may indicate reconstruction error that occurs in a regenerated input as compared to the original input. Loss is informally or mathematically the opposite of inference accuracy. That is, the higher is loss, the less reliably did reconstructive model 150 recognize an input. For anomaly detection, high loss, such as exceeding a threshold, may indicate that the input is anomalous.

When reconstructive model 150 is used for classification such as anomaly detection, reconstruction error may be used as a proxy for inference error. Such use of reconstruction error is especially important for unsupervised learning because, without predefined labels, inference error may be more or less impossible to measure. Thus reconstruction error, instead of inference error, may be used for unsupervised learning by a reconstructive model such as for backpropagation for unsupervised training of an autoencoder.

1.3 Production Inferencing

As mentioned above, training is not the only lifecycle phase of an ML model, and learning is not the only purpose of input reconstruction. The two lifecycle phases of laboratory training and production inferencing are rigid such that all machine learning occurs in the training environment, and no learning occurs in the production environment. That dichotomy may present technical problems as follows.

As explained above, anomaly detection entails recognizing that a complex input matches no learned pattern. In other words, anomaly detection entails recognizing unfamiliarity, which has the following implications.

Accurate input reconstruction is eventually achieved during training. Without training, accurate reconstruction is impossible, in which case reconstruction error is high. By definition, an unfamiliar input is any input that reconstructive model 150 was not trained for. Thus an unfamiliar input in a production environment necessarily causes a high reconstruction error.

In a production environment, an unfamiliar input is an anomaly, which is detectable due to its high reconstruction error. Thus, reconstructive model 150 detects an anomaly when a reconstruction error exceeds an anomaly threshold, which is not threshold 180. However even in a production environment, an anomaly is not the only possible cause of reconstruction error.

1.4 Concept Drift

In a production environment, drift also causes reconstruction error such as concept drift, a.k.a. data drift. In one example, concept drift occurs when a series of inputs evolves over time such that later normal inputs have feature values that are no longer within the value range of earlier normal inputs such as training inputs.

Concept drift may have various causes. For example, seasonality may cause a normal temperature range to shift such that a normal temperature may be mistakenly detected as anomalous or an abnormal temperature may be mistakenly detected as non-anomalous. Seasonality may influence consumer preferences which may interfere with a predictive ML model for a supply chain or for behavioral advertisement targeting.

Concept drift may occur in technical environments such as internet of things (IoT) telemetry or enterprise operations monitoring. For example, as operational trends cause a datacenter's inventory to grow or cause operations to span additional datacenters, various evolutionary changes may occur. For example, contents and patterns of network traffic may evolve, and contents of console logs may evolve. Even a disturbance as innocuous as a software application upgrade or patch may cause such contents and patterns to shift. Thus, natural indications of operations as normal or anomalous may have different value ranges at different times such as according to various gradual trends or sudden planned changes such as according to capacity planning.

Such concept drift causes reconstruction error that, in known approaches, an anomaly detector such as an autoencoder will be unable to distinguish from an actual anomaly such as an accidental outage or a malicious intrusion. In other words and according to known approaches, concept drift causes an anomaly detector to raise a false alarm. If that anomaly detector repeatedly or continuously raises false alarms, the anomaly detector may become more or less useless for two reasons. First, system administrators waste much time with manual forensics and diagnostics to decide whether an alarm is correct or not. Second, system administrators learn to ignore the malfunctioning anomaly detector such that a true alarm for a real problem goes unnoticed.

Such malfunctioning due to concept drift is known as model decay. Computer 100 monitors model decay of reconstructive model 150 by observing a trend of fluctuating confidence 140 that measures ongoing quality of inferences by reconstructive model 150 as explained later herein.

1.5 Input Features

Computer 100 measures and uses feature metrics such as reconstruction error 120 and moving average 130 of feature 111, aggregate statistics 160 and 170 of moving averages of features 111-112, and threshold 180 to monitor and interpret the behavior of reconstructive model 150 as discussed later herein. By operating those feature metrics, computer 100 can: distinguish a true anomaly from concept drift, and detect when model decay due to concept drift is so problematic that escalation is needed such as to alert a system administrator and/or initiate retraining of reconstructive model 150.

Computer 100 may operate those feature metrics in a live environment with a high-speed input stream of inputs such as telemetry without incurring additional latency nor consuming excessive computational resources such that processing overhead for those metrics does not interfere with reconstructive model 150 that provides low-latency inferences in real time.

As discussed earlier herein, a respective reconstruction error such as 120 is separately measured for each individual feature 111-112 for a current input. Although presented as an empirically observed measurement, reconstruction error actually is calculated by a respective error function for each individual feature 111-112. In an embodiment, each error function accepts two arguments and returns one scalar result. The arguments are: the reconstructed value of a feature, and the original value of the same feature as actually provided in the current input.

In an embodiment, a complex input is provided as a feature vector (not shown) that contains a respective value for each of all features 111-112. In an embodiment, the feature vector is homogenous such that respective values of all features are encoded as a same datatype such as a same primitive datatype such as an integer or a unit normalized real number such as floating point. In an embodiment, the feature vector is heterogenous such that each feature may have its own respective datatype.

In an embodiment, a sequential feature such as a calendar month may be encoded as a zero or one based unsigned integer such as 1-12 instead of as text strings such as January. In an embodiment, categorical features such as a feature of unordered and mutually exclusive choices such as tea flavors may be so-called one-hot encoded as a group of mutually exclusive Boolean features. For example, one choice from three flavors may be encoded into three Boolean features in which the corresponding feature is true and the two other Boolean features are false in the feature vector. In an embodiment, a Boolean feature is encoded as a number.

The implementation of a feature's error function compares the original and reconstructed values of the feature to calculate a numeric score that measures a magnitude of a difference between the original and reconstructed values of the feature. In various embodiments, respective error functions of different features each returns a reconstruction error in a same or different numeric range that is respectively normalized or not. For example, some or all error functions may return a real number in the range of 0-1 where zero means perfect reconstruction of an exact match and one means that the reconstruction bears no resemblance to the original value. Here error is, mathematically or informally, the opposite of accuracy.

Techniques herein are robust to support other error ranges that may include negative and positive values and/or unnormalized values. Compensation for such diversity of values may entail squaring and/or range normalization. Thus, reconstruction error 120 is not a raw error as observed or measured, but instead a calculated result that is derived from the raw error as discussed later herein.

1.6 Anomaly Detection

By definition, an anomalous input is unlike other inputs. Whether a current input is by itself anomalous depends only on current reconstruction errors for the features of the current input. According to approaches herein and unlike anomaly detection, concept drift extends beyond any one input to affect many or most inputs, which may render useless other anomaly detection techniques as discussed earlier herein. Techniques herein detect that reconstruction error(s) are abnormal in too many of a sequence of inputs as follows.

Although anomaly detection and concept drift detection are both based on reconstruction error, observable differences are as follows. Anomaly detection alerts a sudden spike in reconstruction error of feature(s). Concept drift is gradual instead of sudden. Concept drift detection is based on past as well as current reconstruction errors as follows.

Computer 100 uses moving averages, such as 130, of respective reconstruction errors of features 111-112 as follows. That is, each of features 111-112 has its own moving average of its own reconstruction error. Moving average 130 may serve two purposes. First, moving average 130 provides smoothing such that a sudden spike in current reconstruction error 120 of feature 111 should not by itself cause a reaction for concept drift detection as the spike should for anomaly detection. That is, moving average 130 facilitates automatically distinguishing an anomalous input from concept drift.

Second, because concept drift is a sustained phenomenon and not fleeting, moving average 130 can indicate a trend in time series data such as a value range shift such as from data drift. Various embodiments may implement moving average calculations of varied complexity such as exponential moving average as discussed later herein.

1.7 Operating in Production

Regardless of how the moving average is calculated, by one exponential moving average formula or another or as a moving average that is not exponential, in any case, computer 100 individually processes a current input to calculate a respective reconstruction error for each feature. While processing the current input, the respective reconstruction error is used to adjust a respective moving average of each feature. While processing the current input, the adjusted moving averages of all features 111-112 are used to calculate average of moving averages 160 and standard deviation of moving averages 170 that, as discussed later herein, are terms for formulaic calculation of confidence 140 that is recalculated for each input in a series of inputs such as a stream or series of batches of inputs. Thus, reconstruction errors drive various instantaneous or continuous calculations upon which confidence 140 is based such as follows.

As explained later herein, anomaly detection based on calculated loss may be based on mean squared error that is based on reconstruction errors of all features 111-112. Calculated loss is needed for detecting whether or not a current input is anomalous. Reconstructive model 150's fluctuating ability to maintain high accuracy and low loss may be impacted by model decay and measured by confidence 140. Herein, confidence 140 is a passive metric that does not alter internal behavior of reconstructive model 150. However, computer 100 may detect when threshold 180 exceeds confidence 140 and react in various ways. That is, reaction to confidence 140 occurs downstream of model operation in a dataflow for a current input.

Such downstream reaction to confidence 140 may have dual purposes as follows and discussed later herein. In an embodiment, confidence 140 may facilitate preventing abnormally trending feature(s) from causing a false alarm for a mistakenly supposed anomaly. In an embodiment, confidence 140 may provide immediate or advanced warning that reconstructive model 150 is malfunctioning due to model decay and/or needs eventual retraining.

1.8 Model Decay

A practical feature vector may have dozens, hundreds, or thousands of features. Concept drift in a few features is unlikely to disturb the numeric output of a mean squared error calculation of loss because averaging across many features has a smoothing effect. For example, a mean squared error of a hundred originally normally behaving features is, after concept drift in ten features, likely to remain in a similar value range. In other words, some concept drift and model decay in some features do not cause calculated loss to become unreliable.

In an embodiment, threshold 180 operates as a retrain threshold that causes a model decay alert when confidence 140 falls below threshold 180. Such excessive model decay means that normal value ranges of too many features have drifted from ranges that reconstructive model 150 was trained for. The retrain threshold is set low enough that some further model decay in additional features may still occur without rendering reconstructive model 150 useless. In other words and as discussed later herein, the retrain threshold provides sufficient advanced notice for automatic or manual administration such as replacement of reconstructive model 150 such as by retraining either immediately or soon such as overnight.

2.0 Confidence Measurement Process

FIG. 2 is a flow diagram that depicts an example process that computer 100 may perform to measure, based on reconstruction error trends, confidence 140 of inferencing by reconstructive model 150. FIG. 2 is discussed with reference to FIG. 1.

In step 201, reconstructive model 150 encodes and decodes all features 111-112 of a current input. For example, the current input may be a photograph, feature 111 may be a count of pixels in the photograph, and feature 112 may be a maximum pixel luminosity in the photograph. For example, reconstructive model 150 may be an autoencoder, which is a kind of artificial neural network (ANN). Although features 111-112 are discrete values, encoding by step 201 may generate a neural encoding that contains discrete values for none, some, or all of features 111-112. In any case, decoding by step 201 should more or less accurately regenerate features 111-112 from the neural encoding.

Step 202 calculates a respective reconstruction error of each feature 111-112. For example, step 202 calculates reconstruction error 120 for feature 111. Mathematics of feature reconstruction error are discussed later herein.

Step 203 calculates a respective moving average of the reconstruction error of each feature 111-112. Each moving average that is based on the reconstruction error of a respective feature is updated. For example, reconstruction error 120 for a current input is used to update moving average 130. Mathematics of moving averages, such as exponential moving average, are discussed later herein.

Step 204 calculates average of moving averages 160 of reconstruction errors of all features 111-112. For example if there are a hundred features, then there are a hundred moving averages. In that case, step 204 sums the hundred moving averages and divides the sum by a hundred to calculate average of moving averages 160.

Step 205 calculates standard deviation of moving averages 170 of reconstruction errors of all features 111-112. For example as explained above, there may be a population of a hundred moving averages, and step 205 calculates the standard deviation of that population according to a known statistical formula.

Based on a ratio of average of moving averages 160 to standard deviation of moving averages 170, step 206 calculates confidence 140 of decoding all features. Mathematics of calculating confidence 140 are presented later herein. In any case, confidence 140 provides a measurement of the quality trend of inferencing by reconstructive model 150.

Step 207 indicates that threshold 180 exceeds confidence 140 of decoding all features. For example and as discussed later herein, confidence 140 falling below threshold 180 may cause computer 100 to react in various ways such as raising an alert and/or causing immediate or deferred retraining of reconstructive model 150.

3.0 Additional Activities for Measuring Confidence

Figure 3:
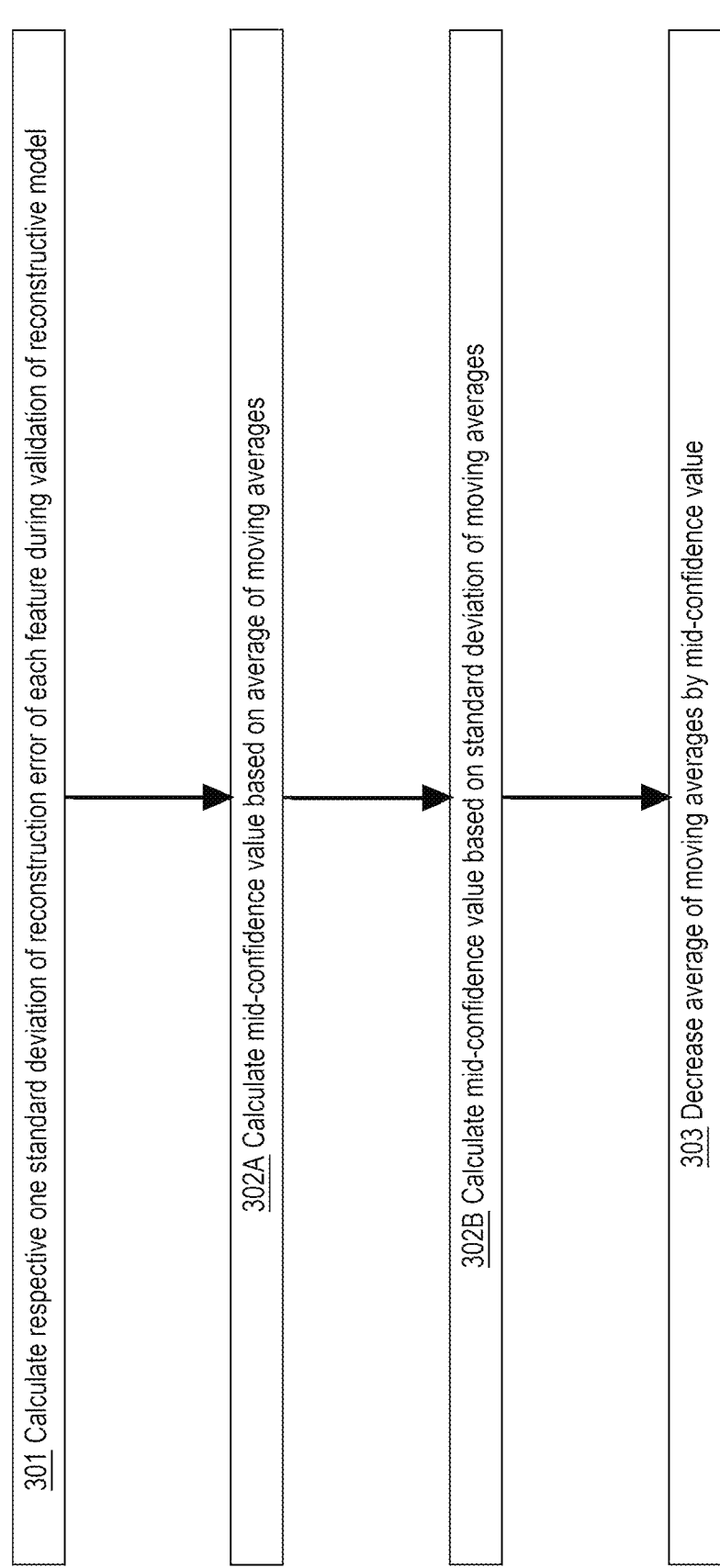
FIG. 3 is a flow diagram that depicts example computer activities for measuring confidence of inferencing by a reconstructive model.

FIG. 3 is a flow diagram that depicts example activities that a computer, such as an implementation of computer 100, may perform to measure confidence of inferencing by a reconstructive model.

The process of FIG. 3 occurs in two phases that may or may not occur on separate computers and/or in separate environments. A preparatory phase that includes steps 301 occurs after training of the reconstructive model and before production deployment, such as during validation of the reconstructive model with validation data. Validation entails exercising the reconstructive model with fewer inputs than during training but enough inputs to detect how the reconstructive model reacts to various representative inputs.

Techniques herein are robust to support various value ranges of raw reconstruction error that may include negative and positive values and/or unnormalized values. Compensation for such diversity of values is as follows. Whether negative or positive, raw reconstruction error is arithmetically squared to ensure a positive value.

Thus, while raw errors of a feature at different times may have negative and positive values, the squared error instead isolates error magnitude as an absolute value. Squared error may also be calculated at runtime in production for a current input, such as for steps 302A-B discussed below, to isolate error magnitude as an absolute value for the same reason. Squared error from validation may be used as follows.

Squaring for absolute value is not the only way to constrain a value range of reconstruction errors of a feature. Value normalization herein is statistically based on a population of reconstruction errors of a feature for multiple inputs. A central tendency is measured as a respective one standard deviation based on reconstruction errors of each respective feature for all inputs during validation in step 301. Standard deviations calculated by step 301 are stored and/or transferred for use in the runtime phase that is as follows.

In a production environment, the runtime phase of the process of FIG. 3 measures confidence of inferencing by the reconstructive model, which entails steps 302A-B and 303. In an embodiment, confidence is calculated according to the following confidence formula.

$$\text{sigmoid}\left(-\frac{(m_t - \overline{m}_\gamma)}{\max(s_t, s_{min})}\right)$$

Terms in the above confidence formula are as follows.

$s_t$ is the instantaneous standard deviation of a population that consists of respective moving averages of reconstruction errors of all features.

$s_{min}$ is a constant that is nearly zero to prevent division by zero.

$m_t$ is the instantaneous average of respective moving averages of reconstruction errors of all features.

$\overline{m}_\gamma$ is mid-confidence as explained below.

In the above confidence formula, sigmoid(x) is a sigmoid function that unit normalizes confidence into a range of zero to one. One indicates that the reconstructive model is inferencing with perfect accuracy. Zero indicates that the reconstructive model is utterly useless due to model decay such that inferencing bears no relation to inputs and may appear as arbitrary or random. An embodiment may have the following sigmoid function.

$$\frac{1}{1 - e^{-x}}$$

A problem with reconstruction errors and squared reconstruction errors is that, even if normalized to a range of zero to one, they may naturally have seemingly arbitrary respective means, medians, and modes. Mid-confidence is a range-shifting calibration to ensure that confidence of inferencing is normally 0.5. An embodiment may have the following mid-confidence formula.

$$\overline{m}_\gamma = \text{mean}\left(\frac{\mu_{v,i}}{\max(\sigma_{v,i}, \sigma_{min})}\right) + k \times std\left(\frac{\mu_{v,i}}{\max(\sigma_{v,i}, \sigma_{min})}\right)$$

Terms in the above mid-confidence formula are as follows.

$\sigma_{v,i}$ is a respective one standard deviation of reconstruction error of each feature as calculated during validation in step 301. Standard deviation is used in the above mid-confidence formula for normalization from natural units to statistical units as explained later herein.

$\sigma_{min}$ is a constant that is nearly zero to prevent division by zero.

$\mu_{v,i}$ is a respective moving average of reconstruction error of each feature as calculated at runtime.

mean( ) and std( ) respectively are the mean and standard deviation of a respective argument at runtime.

k is a bias constant as discussed below.

Bias constant k is predefined to increase or decrease the confidence of inferencing according to various use cases and risk tolerances that may naturally have an administrative preference to avoid overestimated confidence or, instead, avoid underestimated confidence as to whether or not confidence remains normal in operation. For example, a preference for underestimated confidence may be natural when reactions to low confidence, such as retraining, are inexpensive, fast, and/or not disruptive. Increasing k causes confidence to be overestimated.

In the above explanation of confidence and mid-confidence are various calculations of terms and intermediate results that are performed by steps 302A-B and 303 as follows. Steps 302A-B are sub-steps that cooperate to calculate mid-confidence. In other words, calculating mid-confidence entails both of steps 302A-B.

Step 302A calculates mid-confidence based on the instantaneous average of respective moving averages of reconstruction error of all features, shown as mean( ) in the above mid-confidence formula. Step 302B calculates mid-confidence based on the instantaneous standard deviation of a population that consists of respective moving averages of reconstruction error of all features, shown as std( ) in the above mid-confidence formula.

Step 303 calculates a numerator needed for calculating confidence of inferencing by decreasing the average of respective moving averages of reconstruction errors of all features, shown as $m_t$ in the above confidence formula, by subtracting mid-confidence, shown as $m_t-\overline{m}_\gamma$ in the above confidence formula.

4.0 Moving Average Calculation

As discussed above, moving averages of standard deviations or of average error are used to calculate confidence and mid-confidence. A moving average is a so-called rolling calculation of varied robustness in various embodiments as follows. A straightforward implementation of a moving average may be based on an accumulator for summation and a counter, which is risky because the accumulator may eventually overflow. In a safer but less efficient embodiment, a moving average is calculated from a limited fixed amount of most recent inputs such as a sliding window of a hundred most recent inputs.

Exponential moving average is a calculation that is safe and efficient with various arithmetic embodiments. In one embodiment, a counter tallies how many inputs were processed so far, and a delta measures an arithmetic difference of a previous moving average less a reconstruction error of a current input. The delta is then scaled down according to a progressively diminishing weight such as 2/counter. That weighted delta is then added to the previous moving average to derive the next moving average.

Various embodiments have various formulae for calculating an exponential moving average. In a most efficient embodiment that lacks a counter, an exponential moving average may instead be calculated as $\mu_{t+1}=\mu_t(1-a)+d_{t+1}a$, where t is an implied count of previous inputs, where $\mu_t$ is the previous moving average, $\mu_{t+1}$ is the next moving average, $d_{t+1}$ is the current reconstruction error or standard deviation, and a is a constant weight.

5.0 Mahalanobis Distance

As discussed above, reconstruction errors or an average of errors may be normalized from natural units to statistical units according to a ratio that divides a raw amount by one standard deviation. Such normalization is especially useful for multidimensional mathematics and analysis. For example, respective reconstruction errors of multiple features of one input may define a point in multidimensional space, and the extent of reconstruction errors of those multiple features for many inputs may have respective ranges that define the multidimensional space.

Reconstruction error of each feature may have a respective natural range that may be somewhat normalized into a shared range of zero to one. However, mathematical uniformity is not necessarily achieved despite such rescaling. For example, reconstruction errors of various features may have various means, medians, and modes despite rescaling.

For example, a 0.2 amount of change in a moving average of one feature may be more anomalous than a same absolute amount of change in a moving average of a different feature, even though errors or averages of errors of both features may share a same scale from zero to one. Uniformity is instead achieved by further normalization by dividing an amount by one standard deviation for a respective feature as discussed above and assuming a normal distribution. Thus, an absolute amount of statistically normalized change for any feature has a same statistical significance regardless of which feature.

By such statistical normalization, a raw multidimensional space having discrepant means, medians, and modes along the several dimensions is instead represented as a statistically normalized multidimensional space in which at least the means of the several dimensions should be identical. In that way, an absolute movement in any statistically normalized dimension has a same statistical significance as it would for any other dimension in the same space. Such uniformity means that all features can be treated equally such as in the formulae presented earlier herein.

Multidimensional movement, such as represented as a vector in multidimensional space, is measured in a statistically normalized space according to respective standard deviations of the several dimensions. Such a measurement is known as Mahalanobis distance. Novel and in that way, confidence of inferencing may be based on Mahalanobis distance.

As explained above, statistical uniformity means that all features can be treated equally. In other words, solutions herein are agnostic to features and features spaces and are thus portable to any reconstructive model of any model architecture, transparent or opaque, in any application domain with any dataset. Thus, techniques herein are reconstructive model agnostic and application agnostic. Such portability may be leveraged as follows.

In a first example, concept drift causes standard deviations of reconstruction errors of respective features to permanently change, regardless of whether or not the respective raw ranges (i.e. minimum and maximum) of errors change or not. Sufficient recalibration of normalization is achieved by retraining and revalidating, because standard deviations are recalibrated by revalidating herein as discussed above for validation.

In a second example, retraining entails hyperparameter optimization. In other words, the reconstructive model is reconfigured statically before or dynamically during retraining. For example, the reconstructive model may have various configuration settings that can be experimentally adjusted and tuned to improve accuracy of retraining. Adjusted hyperparameters may cause standard deviations and ranges of reconstruction errors to change, which the above validation recalibration automatically compensates for.

In a third example, the reconstructive model may become obsolete and be replaced by a different reconstructive model of a different implementation or architecture. For example, developers may switch from one Python machine learning code library to a rival Python library. Likewise, manual or automatic ranking of multiple discrepant reconstructive models may cause the obsolete reconstructive model to be deselected.

For example, model selection may detect that an autoencoder is no longer a best architecture for a given anomaly detection application. Such more or less radical substitution of reconstructive models may cause standard deviations and ranges of reconstruction errors to change, which the above validation recalibration automatically compensates for, which encourages experimentation and exploration of alternative configurations, implementations, and architectures to increase inference accuracy, decrease training time, and/or decrease computer resource consumption in production.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
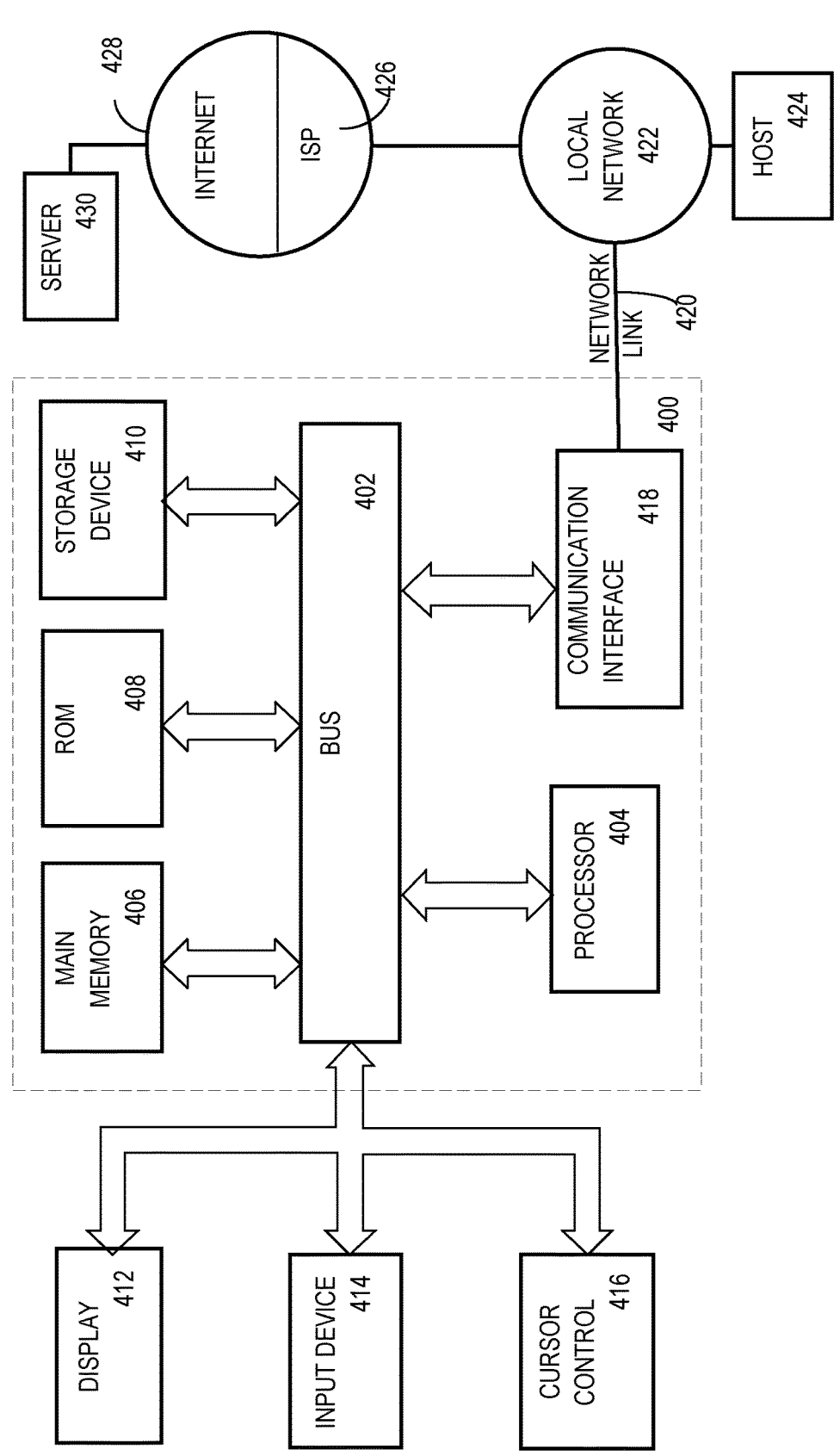
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer $L-1$ to a layer L. Given the number of neurons in layer $L-1$ and L is $N[L-1]$ and $N[L]$, respectively, the dimensions of matrix W is $N[L-1]$ columns and $N[L]$ rows.

Biases for a particular layer L may also be stored in matrix B having one column with $N[L]$ rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer $L-1$ to L. An activation neuron represents an activation function for the layer that includes the activation function. An activation neuron in layer L corresponds to a row of weights in a matrix W for the edges between layer L and $L-1$ and a column of weights in matrix W for edges between layer L and $L+1$. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
a reconstructive machine learning model encoding and decoding a plurality of features in a new dataset;
automatically calculating based on said decoding the plurality of features:
a respective reconstruction error of each feature of the plurality of features,
a respective moving average of said reconstruction error of said each feature,
an average of said moving averages of said reconstruction errors of the plurality of features,
a standard deviation of said moving averages of said reconstruction errors of the plurality of features, and
a confidence of said decoding the plurality of features that is based on a ratio of said average of said moving averages of said reconstruction errors to said standard deviation of said moving averages of said reconstruction errors;
detecting that a retrain threshold exceeds said confidence of said decoding the plurality of features; and
retraining, in response to said detecting, the reconstructive machine learning model with the new dataset;
wherein the method is performed by one or more computers.

2. The method of claim 1 wherein said reconstruction error of each feature of the plurality of features comprises at least one calculated amount selected from the group consisting of: a squared error, and an error normalized by one standard deviation of error of the feature.

3. The method of claim 1 further comprising calculating one standard deviation of error of each feature of the plurality of features during validation of the reconstructive machine learning model.

4. The method of claim 1 wherein said moving average of said reconstruction error of each feature of the plurality of features comprises an exponential moving average.

5. The method of claim 1 wherein said confidence of said decoding the plurality of features is based on said ratio of said average of said moving averages to said standard deviation of said moving averages comprises a sigmoid function that is based on said ratio of said average of said moving averages to said standard deviation of said moving averages.

6. The method of claim 5 wherein said sigmoid function that is based on said ratio of said average of said moving averages to said standard deviation of said moving averages comprises said sigmoid function is based on a Mahalanobis distance of said reconstruction errors of the plurality of features.

7. The method of claim 1 further comprising decreasing said average of said moving averages by a mid-confidence value.

8. The method of claim 7 further comprising calculating said mid-confidence value based on said average of said moving averages.

9. The method of claim 7 further comprising calculating said mid-confidence value based on said standard deviation of said moving averages.

10. One or more non-transitory computer-readable media storing instructions that, when executed by one or more processors, cause:
a reconstructive machine learning model encoding and decoding a plurality of features in a new dataset;
automatically calculating based on said decoding the plurality of features:
a respective reconstruction error of each feature of the plurality of features,
a respective moving average of said reconstruction error of said each feature,
an average of said moving averages of said reconstruction errors of the plurality of features,
a standard deviation of said moving averages of said reconstruction errors of the plurality of features, and
a confidence of said decoding the plurality of features that is based on a ratio of said average of said moving averages of said reconstruction errors to said standard deviation of said moving averages of said reconstruction errors;
detecting that a retrain threshold exceeds said confidence of said decoding the plurality of features; and
retraining, in response to said detecting, the reconstructive machine learning model with the new dataset.

11. The one or more non-transitory computer-readable media of claim 10 wherein said reconstruction error of each feature of the plurality of features comprises at least one calculated amount selected from the group consisting of: a squared error, and an error normalized by one standard deviation of error of the feature.

12. The one or more non-transitory computer-readable media of claim 10 wherein the instructions further cause calculating one standard deviation of error of each feature of the plurality of features during validation of the reconstructive machine learning model.

13. The one or more non-transitory computer-readable media of claim 10 wherein said moving average of said reconstruction error of each feature of the plurality of features comprises an exponential moving average.

14. The one or more non-transitory computer-readable media of claim 10 wherein said confidence of said decoding the plurality of features is based on said ratio of said average of said moving averages to said standard deviation of said moving averages comprises a sigmoid function that is based on said ratio of said average of said moving averages to said standard deviation of said moving averages.

15. The one or more non-transitory computer-readable media of claim 14 wherein said sigmoid function that is based on said ratio of said average of said moving averages to said standard deviation of said moving averages comprises said sigmoid function is based on a Mahalanobis distance of said reconstruction errors of the plurality of features.

16. The one or more non-transitory computer-readable media of claim 10 wherein the instructions further cause decreasing said average of said moving averages by a mid-confidence value.

17. The one or more non-transitory computer-readable media of claim 16 wherein the instructions further cause calculating said mid-confidence value based on said average of said moving averages.

18. The one or more non-transitory computer-readable media of claim 16 wherein the instructions further cause calculating said mid-confidence value based on said standard deviation of said moving averages.

* * * * *